US006961846B1

(12) United States Patent
Fleck et al.

(10) Patent No.: US 6,961,846 B1
(45) Date of Patent: *Nov. 1, 2005

(54) DATA PROCESSING UNIT, MICROPROCESSOR, AND METHOD FOR PERFORMING AN INSTRUCTION

(75) Inventors: Rod G. Fleck, Mountain View, CA (US); Karl-Heinz Mattheis, San Jose, CA (US)

(73) Assignee: Infineon Technologies North America Corp., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/928,427

(22) Filed: Sep. 12, 1997

(51) Int. Cl.[7] .............................................. G06F 9/305
(52) U.S. Cl. ...................................... 712/223; 712/221
(58) Field of Search ................................ 712/221, 223; 364/716.01, 716.07; 340/146.2

(56) References Cited

U.S. PATENT DOCUMENTS

| | | | | |
|---|---|---|---|---|
| 3,656,109 A | * | 4/1972 | Conway ................... | 340/146.2 |
| 3,723,710 A | * | 3/1973 | Crouse et al. .......... | 235/462.19 |
| 4,003,033 A | * | 1/1977 | O'Keffee et al. ........... | 710/107 |
| 4,061,880 A | * | 12/1977 | Collins et al. .............. | 370/382 |
| 4,112,490 A | * | 9/1978 | Pohlman et al. ............ | 710/107 |
| 4,163,211 A | * | 7/1979 | Miura ...................... | 340/146.2 |
| 4,164,025 A | * | 8/1979 | Dubnowski et al. ........ | 707/533 |
| 4,257,110 A | * | 3/1981 | Lamb et al. ................... | 365/49 |
| 4,338,675 A | * | 7/1982 | Palmer et al. .............. | 708/510 |
| 4,533,992 A | * | 8/1985 | Magar et al. ................. | 712/42 |
| 4,728,927 A | * | 3/1988 | Aman et al. ............. | 340/146.2 |
| 5,251,203 A | * | 10/1993 | Thompson .................. | 370/407 |
| 5,442,577 A | * | 8/1995 | Cohen ........................ | 364/716 |
| 5,559,952 A | * | 9/1996 | Fujimoto .................... | 345/511 |
| 5,751,614 A | * | 5/1998 | Cohen .................. | 364/716.02 |
| 5,764,550 A | * | 6/1998 | D'Souza ................ | 364/716.04 |
| 5,781,457 A | * | 7/1998 | Cohen et al. .......... | 364/716.02 |
| 5,838,986 A | * | 11/1998 | Garg et al. .................... | 712/23 |

OTHER PUBLICATIONS

Tom Shanley and Don Anderson, "ISA System Architecture, Third Edition", pp. 53–56 (1995).

* cited by examiner

*Primary Examiner*—David Y. Eng
(74) *Attorney, Agent, or Firm*—Fish & Richardson P.C.

(57) ABSTRACT

The present invention relates to a data processing unit for executing instructions stored in a memory comprising a plurality of registers coupled with an execution unit comprising a logic unit for execution of logic operations. The logic unit comprises a first logic operator which can be coupled with a first and second register as an input register and which generates an output bit as a result of a logic operation. It further comprises a Boolean operator which receives the output bit of the first logic operator as a first input and second input bit from a third register which generates an output bit as a result of a Boolean operation.

29 Claims, 3 Drawing Sheets

DATA PROCESSING UNIT, MICROPROCESSOR, AND METHOD FOR PERFORMING AN INSTRUCTION

BACKGROUND OF THE INVENTION

The invention relates to a data processing unit for executing instructions stored in a memory comprising a plurality of registers coupled with an execution unit comprising a logic unit for execution of logic operations. Data processing units such as microprocessors or micro controllers are used in a plurality of applications. To facilitate programming of these data processing units, users can use high level programming languages, such as "C" or "Pascal", or lower level programming languages such as Assembler. For quicker programming and independence from the actual target microprocessor or microcontroller, it is preferred to program the respective machines in one of the high level programming languages. Many commands in a high level programming language, such as "C", can be translated into single machine language instructions. However, many commands, such as conditional branching instructions, need a plurality of machine code instructions, which in sequence can slow down execution of a program.

SUMMARY OF THE INVENTION

It is therefore an object of the present invention to provide a data processing unit with the capability of executing logical instructions in parallel. This object is achieved by a data processing unit for executing instructions stored in a memory comprising a plurality of registers coupled with an execution unit comprising a logic unit for execution of logic operations. The logic unit comprises a first logic operator which can be coupled with a first and second register as an input register and which generates an output bit as a result of a logic operation. It further comprises a Boolean operator which receives the output bit of the first logic operator as a first input and second input bit from a third register which generates an output bit as a result of a Boolean operation.

In a second embodiment, the logic unit comprises a shifter coupled with a first register performing a shift operation on said register, and a logic operator which can be coupled with a second and a third register as input register and which generates an output bit as a result of a logic operation. The output bit is stored in the first register.

The embodiments, according to the present invention, allow execution of two instructions in parallel thereby accelerating execution of logical instructions, and making it easy and efficient to translate high level programming language into machine instructions.

DESCRIPTION OF THE PREFERRED EMBODIMENT

FIGS. 1–4 show examples of how the registers of a register file are connected to the respective elements of, for example, an integer execution unit to execute the respective instructions.

Instructions are generally stored in a memory coupled with a microcontroller or microprocessor. The microcontroller or microprocessor comprises an execution unit which has, for example, a logical and an arithmetic execution unit. This execution unit controls all couplings between respective registers and logical and/or arithmetic operators.

Figure 1:
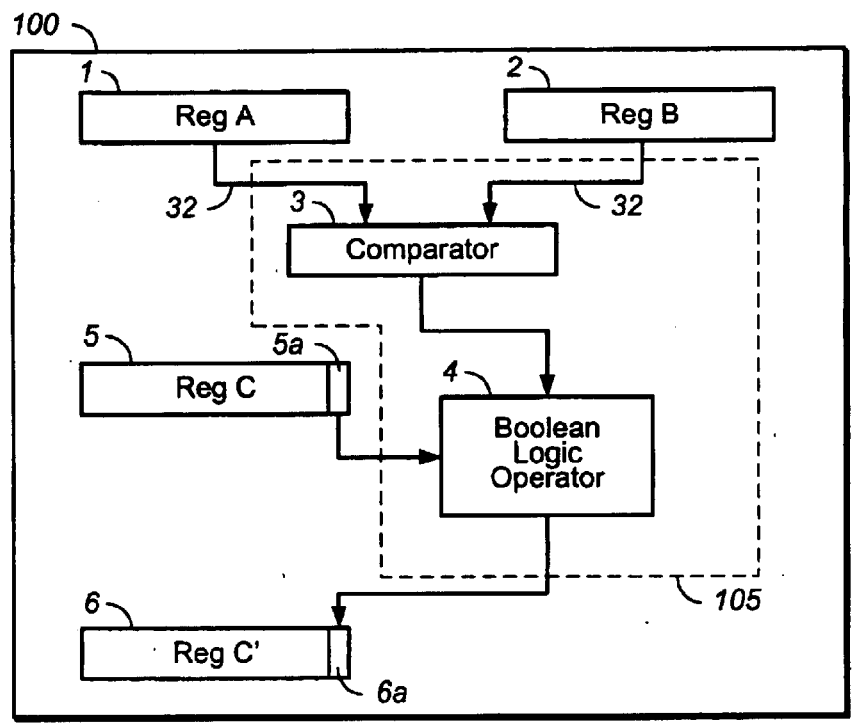
FIG. 1 shows a block diagram of a first embodiment according to the present invention.

In FIG. 1, numeral 1 denotes a first register A and numeral 2 denotes a second register B. Both registers 1, 2 belong to a register file with, for example, a plurality of 32 bit registers. Numeral 5 denotes a third register C which is also part of the register file. The 32 bits of each register 1 and 2 are coupled with the respective inputs of a comparator unit 3. The comparator unit 3 is capable of comparing both 32 bit words of each register 1 and 2 in different ways. For example, the comparison instruction can check whether the content of register A is greater than, equal to, less than, etc., the content of register B. Comparator unit 3 generates an output signal comprising a single bit which indicates whether the comparison instruction result is true or false. This output signal is fed to the first input of a Boolean logic operator 4. One single bit, for example, the least significant bit of register C is coupled with the second input of the Boolean logic operator 4. Boolean logic operator 4 can comprise a single or multiple logic operators, such as AND, OR, NAND, NOR, etc., operators. Boolean logic operator 4 generates a single output bit which is stored in a register 6. Register 6 can be equal to register 5 as indicated in FIG. 1 by the register name $C^1$. Registers 1, 2, 5 and 6 can be freely selected from the register file, whereby it is even possible to assign a single register for registers 1, 2, 5 and 6. The instruction proper executes a comparison between register 1 and register 2. The result is combined with a previous comparison result which is stored in register 5. The Boolean combination is done preferably as either a logic AND, OR, or XOR operation.

Such a machine code instruction can be executed in one cycle, because the result of the Boolean logic operator can be accessed with almost no delay. The comparison instruction, which can be any one of =, ≠, <, >, etc., to allow a translation of the following "C"-expression in only two machine code instructions. An example of such a "C"-expression is:

$$d5=(d1<d2)|(d3==d4).$$

Assuming all variables have been mapped into registers, than the two instruction sequence will compute d5:

lt d5, d1, d2; compute (d1<d2)

or. eq. d5, d3, d4; OR with (d3==d4).

Figure 2:
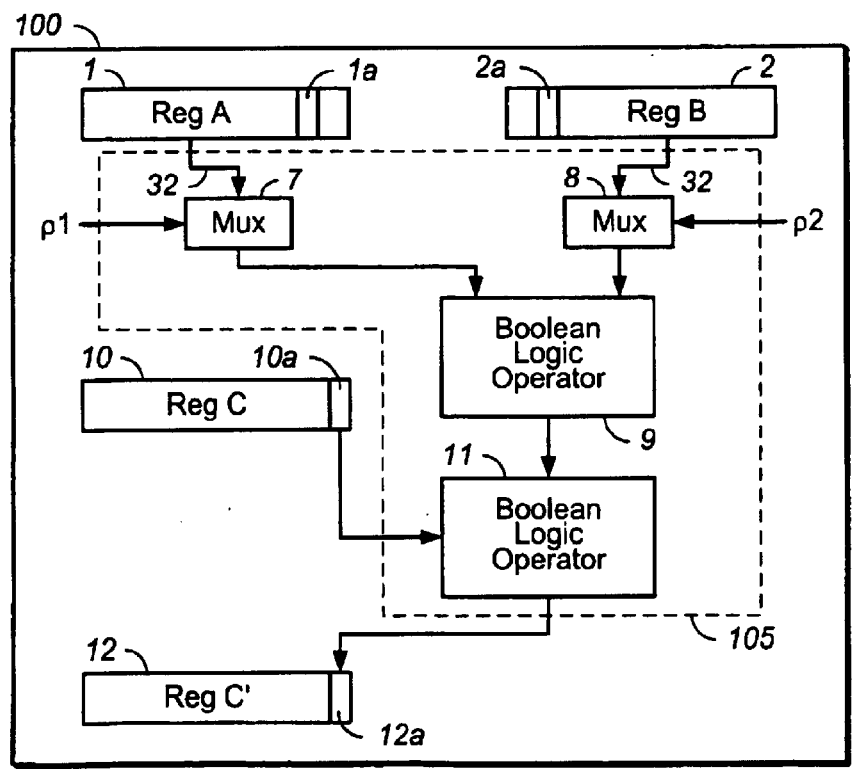
FIG. 2 shows a second embodiment according to the present invention.

In FIG. 2, the 32 bits of register 1 are fed to 32 input terminals of a multiplexer 7. In the same way, the 32 bits of register 2 are coupled with the 32 inputs of a multiplexer 8. Multiplexer 7 and 8 provide a select input p1 and p2, respectively. By means of these select inputs p1 and p2 a single bit 1a or 2a of registers 1 and 2 can be selected. Therefore, multiplexer 7 couples one of the 32 bits of register 1 with a first input of a first Boolean logic operator 9 and multiplexer 8 couples one of the 32 bits of register 2 with a second input of the Boolean logic operator 9. Boolean logic operator 9 generates a single bit output signal which is fed to a first input of a second Boolean logic operator 11. The second input of Boolean logic operator 11 is coupled with a single bit 10a of register 10. This single bit can be the least significant bit or any bit selected by a multiplexer as shown for registers 1 and 2. The output of Boolean logic operator is also a single bit signal which is coupled with a single bit 12a of a fourth register 12.

For the evaluation of Boolean logic expressions, the data processing unit according to the present invention, provides special instructions. In particular, evaluation of complex Boolean equations benefits from a three-input Boolean function similar to the one described in FIG. 1. Instead of comparator 3, a first Boolean logic operator 9 executes a Boolean operation on two single bits, whereby each bit is selected from one of the registers 1 and 2. The result of this operation is combined by a second Boolean logic operator 11 with a single bit 10a of a third register which may preferably be the least significant bit of this register 10. The result of this operation can be stored in a single bit of a register 12 which again can be the same register which provides the second input for Boolean logic operator 11. In this case, the most significant bits, that is all bits except bit 12a, of register 12 remain unchanged. Nevertheless, the result could also be expanded to, for example, fill the whole register, or to set all other bits to "0".

The possible three- or four-input operations can be any combination of Boolean logic, for example, AND.AND, AND.NAND, AND.NOR, AND.OR, OR.AND, OR.NAND, OR.NOR, OR.OR, etc. As the instructions size is often limited, third and fourth registers 10 and 12 can be the same registers and the least significant bit is always used as an input bit for Boolean logic operator 11 and as the target for the output bit of Boolean logic operator 11. Thus, the content of register 10 will be overwritten by the result of the operation. Therefore, if one needs the original value later on, it has to be conserved in a different location.

Figure 3:
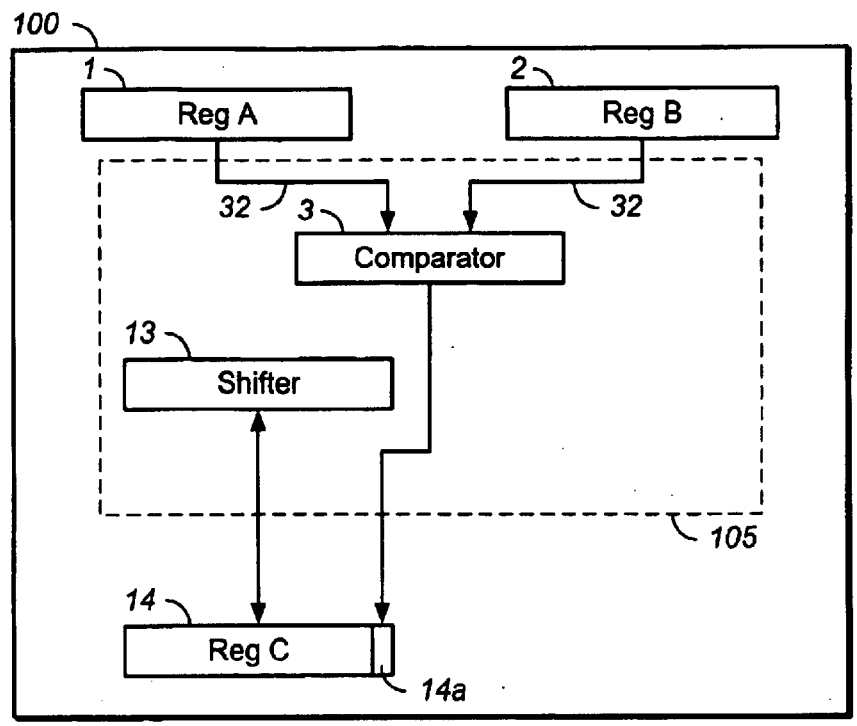
FIG. 3 shows a third embodiment according to the present invention.

FIG. 3 shows a third embodiment of the present invention. Register 1, register 2 and comparator 3 are coupled in the same way as in FIG. 1. The output of comparator 3 is again a single bit line which is coupled with a single bit 14a of a register 14. Register 14 is coupled with a shifter 13.

Certain control applications require that several Booleans are packed into a single register. This set of packed bits can be used as index into a constant table or jump table. Using a table allows complex Boolean functions and/or state machines to be evaluated efficiently. Also, high level languages, such as "C" or "Pascal", support so-called switch-case instructions which require a plurality of comparison instructions upon which one of a plurality of instruction routines will be selected. To facilitate the packing of Boolean results into a register, the embodiment according to the present invention provides a so-called compound "compare with shift" instruction. The result of the comparison executed by a comparator unit 3 is placed in the least significant bit of the result register 14 after the contents of the register 14 has been left shifted by one position. As mentioned, the shift operation is preferably a left shift by one position, but can also be a right shift or a multiple bit left or right shift.

Figure 4:
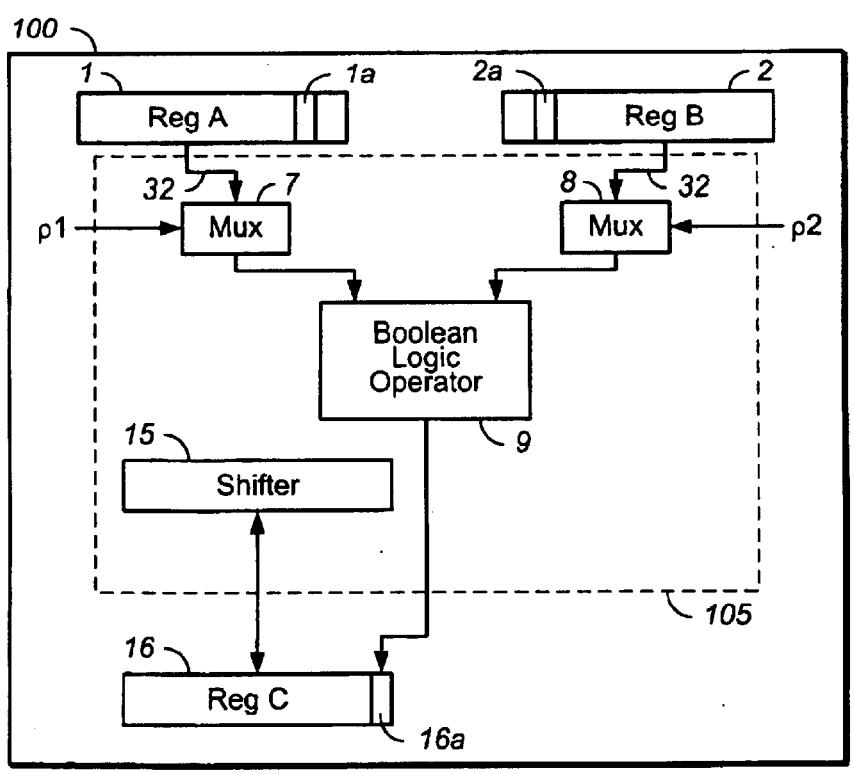
FIG. 4 shows a fourth embodiment according to the present invention.

FIG. 4 shows a fourth embodiment according to the present invention. Elements 1, 2, 7, 8 and 9 are coupled in the same way as in FIG. 2. The single output bit line of Boolean logic operator 9 is coupled with a single bit 16a of register 16. Register 16 is coupled with a shifter 15.

As mentioned before and shown in FIG. 3, the results of bit operations often need to be packed into a single register for controller applications. For this reason, a plurality of instructions can be combined with a shift prefix. These operations first perform a single bit left shift on the destination register 16 and then store the result of the two-input logic function executed by Boolean logic operator 9 into its least significant bit 16a. As an example, how efficiently a high level programming language can be translated into machine code, an example of "C" code could be:

OUT0=b^d;
OUT1=(a&b)| (c&d);

Assume that the inputs are stored in the least significant bits of D0, that is:

D0:0 represents a;
D0:1 represents b;
D0:2 represents c; and
D0:3 represents d, and the two outputs should be packed into the two least significant bits of D1. The appropriate instruction sequence to compute this would be:

and.t D1, D0:0, D0:1
or.and.t D1, D0:2, D0:3 sh.xor.t D1, D0:1, D0:3.

The first instruction writes the result of (a & b) into bit 0 of register D1. The second instruction combines (c & d) with D1:0 and stores the output back into it. Sh.xor.t finally shifts D1 one bit to the left, thus moving D1:0 to D1:1, and saves the result of the XOR operation (b^d) in D1:0. So OUT1 and OUT0 are packed in D1:1 and D1:0.

Figure 5:
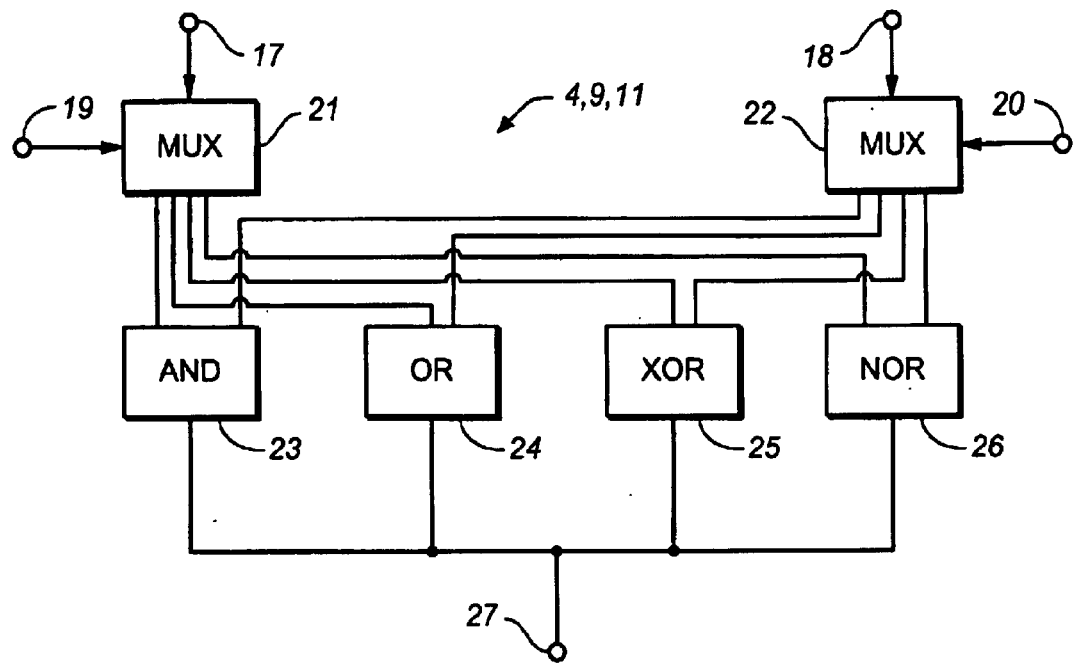
FIG. 5 shows a first embodiment of a Boolean logic operator according to one of the figures, FIG. 1, 2 or 4.

FIG. 5 shows an example of a selectable Boolean logic operator 4, 9 or 11. A first input bit can be fed to a terminal 17 which is coupled with an input of a multiplexer 21 which is controlled by a control signal fed to terminal 19. Multiplexer 21 has four outputs which are coupled with respective first inputs of four Boolean operators 23, 24, 25 and 26. A second multiplexer 22 is provided, the input of which is connected to a terminal 18 which can be connected to the second input. A control input terminal 20 is connected to the control input of multiplexer 22. At least two lines are needed for control inputs 19 and 20 to select between the four different operators. Multiplexer 22 comprises four outputs which are connected to the second inputs of the four Boolean operators 23, 24, 25 and 26, respectively. The four Boolean operators 23, 24, 25 and 26 provide open collector outputs which are coupled to an output terminal 27.

Figure 6:
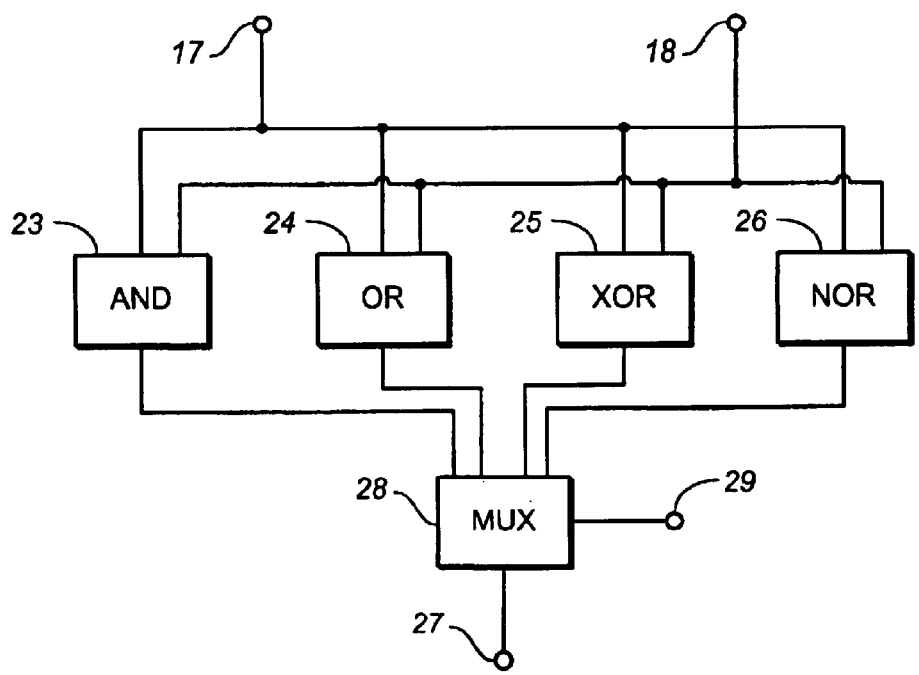
FIG. 6 shows a second embodiment of a Boolean logic operator.

FIG. 6 shows a second embodiment which uses only one multiplexer 28 which is coupled between the outputs of the Boolean operators 23, 24, 25 and 26. Terminals 17 and 18 are connected with each first and second input of Boolean operators 23, 24, 25 and 26. Terminal 29 feeds a select signal to multiplexer 28.

A plurality of different Boolean operators can be included in such a Boolean logic unit. Additionally, or in substitution, NOR and NAND elements can be formed by additional inverters which can be coupled with inputs or outputs of the respective logic element. Thus, a wide variety of logic operations can be executed by such a unit.

What is claimed is:

1. Microprocessor comprising:
    a register file having a plurality of registers, the register file including a first register, a second register and a third register, the first, second, and third registers being freely selectable from the plurality of registers; and
    an execution unit coupled with said plurality of registers, said execution unit comprising a logic unit for execution of a logic operation, wherein said logic unit comprises:
        a first logic operator which can be coupled with said first register and said second register as inputs and which generates a single output bit as a result of a
logic operation, and a Boolean operator which receives said single output
bit of said first logic operator as a first input and a
second input bit from said third register and which
generates an output bit as a result of a Boolean
operation, wherein the execution unit implements a single machine
code instruction using the logic operation.

2. Microprocessor as in claim 1, wherein said first logic operator performs a comparison operation.

3. Microprocessor as in claim 1, wherein said result of said Boolean operation is stored in said third register as the least significant bit.

4. Microprocessor as in claim 1, wherein said result of said Boolean operation is expanded to be stored in said third register as a plurality of bits.

5. Microprocessor as in claim 1, wherein said first, second, and third registers can be freely selected from among the plurality of registers.

6. Microprocessor as in claim 1, wherein said first logic operator and said Boolean operator are configured to generate their respective said single output bit and said output bit in executing a single machine instruction of said microprocessor.

7. Microprocessor as in claim 1, wherein said first logic operator and said Boolean operator are configured to generate their respective said single output bit and said output bit within a single cycle.

8. Data processing unit comprising:

a register file having a plurality of registers, the register file including a first register, a second register and a third register, the first, second, and third registers being freely selectable from the plurality of registers; and an execution unit coupled with said plurality of registers, said execution unit comprising a logic unit for execution of a logic operation, wherein said logic unit comprises:

a first logic operator which can be coupled with said first register and said second register as inputs and which generates a single output bit as a result of a logic operation, wherein said first logic operator performs a Boolean operation, and a Boolean operator which receives said single output bit of said first logic operator as a first input and a second input bit from said third register and which generates an output bit as a result of a Boolean operation;

wherein the execution unit implements a single machine code instruction using the logic operation, and wherein the data processing unit is adapted to execute programmed instruction sequences stored in a memory, and said programmed instruction sequences comprise machine code instructions that result from a compilation of source code written in a high-level programming language, the machine code instructions including the single machine code instruction.

9. Data processing unit as in claim 8, wherein said Boolean operation of said first logic operator is performed on a definable single bit of each of said first and second registers.

10. Data processing unit for executing instructions stored in a memory comprising:

a register file having a plurality of registers, the register file including a first register, a second register and a third register, the first, second, and third registers being freely selectable from the plurality of registers; and an execution unit coupled with said plurality of registers, said execution unit comprising a logic unit for execution of logic operation, wherein said logic unit comprises:

a shifter coupled with said first register to perform a shift operation on said first register, and a logic operator which can be coupled with said second register and said third register as inputs and which generates an output bit as a result of a logic operation, wherein said output bit is stored in one bit location of said first register, wherein said shift operation is performed before said output bit of said logic operation is stored in said first register, and wherein said shift operation and said generating of said output bit are based on a single machine code instruction.

11. Data processing unit as in claim 10, wherein said output bit is stored in the least significant bit of said first register.

12. Data processing unit as in claim 10, wherein said logic operator performs a comparison operation.

13. Data processing unit as in claim 10, wherein said logic operator performs a Boolean operation.

14. Data processing unit as in claim 10, wherein said Boolean operation of said first logic operator is performed on a definable single bit of each of said second and third registers.

15. Method for performing an instruction in an execution unit of a data processing unit comprising the steps of:

shifting a content of a first register to generate a shifted content and in parallel performing a first logic operation with contents of a second register and a third register to generate a first result;

writing said first result of said first logic operation into a portion of said first register with the shifted content of said first register to generate an existing content;

performing a second logic operation with contents of a fourth register and a fifth register to generate a second result;

logically combining the second result of said second logic operation with the existing content of said first register to generate a third result; and overwriting said existing content of said first register with said third result of said logically combining;

wherein said performing said second logic operation and said logically combining are executed within a single cycle.

16. Method according to claim 15, wherein said first result is written into a least significant bit of said first register.

17. Method according to claim 15, wherein said first logic operation is a Boolean operation.

18. Method according to claim 17, wherein a single bit of said second register and a single bit of said third register are used as for said Boolean operation.

19. Method as in claim 15, wherein said second, logic operation is OR, and said existing content of said first register consists of a single bit of said first register.

20. Data processing unit for executing programmed instruction sequences stored in a memory comprises:

a register file having a plurality of registers, including a first register, a second register and a third register, the first, second, and third registers being freely selectable from the plurality of registers; and an execution unit coupled with said plurality of registers, said execution unit comprising a logic unit for execution of logic operation, wherein said logic unit comprises:

a first logic operator which can be coupled with said first register and said second register as inputs and which generates a single output bit as a result of a logic operation, wherein said first logic operator is capable of performing any of multiple types of comparisons, and a Boolean operator which receives said single output bit of said first logic operator as a first input and a second input bit from said third register and which generates an output bit as a result of a Boolean operation, wherein the execution unit implements a single machine code instruction using the logic operation.

21. Data processing unit as in claim 20, wherein said multiple types of comparisons include less-than and equal-to.

22. Data processing unit as in claim 20, wherein said data processing unit is capable of evaluating in no more than two machine code instructions a Boolean expression that includes an OR of the respective results of a less-than expression and an equal-to expression.

23. Data processing unit as in claim 22, wherein the less-than expression compares values of two registers and the equal-to expression compares values of another two registers.

24. Data processing unit for executing programmed instruction sequences stored in a memory, the data processing unit comprising:

a register file having a plurality of registers; and, an execution unit coupled with said plurality of registers, said execution unit comprising:

a first logic operator that is coupled to receive a first input and a second input from said plurality of registers and that produces an output based on comparing said first and second inputs, and a second logic operator that is coupled to receive said output of said first logic operator as a first input, is coupled to receive a second input from said plurality of registers, and produces an output based on a Boolean operation;

wherein said programmed instruction sequences include machine instructions of said data processing unit, and said outputs produced by said first and second logic operators are produced based on a single machine instruction of said data processing unit.

25. Data processing unit as in claim 24, wherein said programmed instruction sequences comprise machine code instructions that result from a compilation of source code written in a high-level programming language.

26. Data processing unit as in claim 24, wherein said first and second inputs of said first logic operator, and said second input of said second logic operator, are capable of being freely selected from among the plurality of registers.

27. Data processing unit as in claim 26, wherein said first logic operator is coupled to multiplexors to receive a single bit, from a first register, as said first input and to receive a single bit, from a second register, as said second input.

28. Data processing unit as in claim 24, wherein said second logic operator includes logic selectable by control signal from a set of available logic, the set of available logic including AND and OR.

29. Method for performing an instruction in an execution unit of a data processing unit comprising the steps of:

shifting a content of a first register to generate a shifted content and in parallel performing a first logic operation with contents of a second register and a third register to generate a first result;

writing said first result of said first logic operation into a portion of said first register with the shifted content of said first register to generate existing content;

performing a second logic operation with contents of a fourth register and a fifth register to generate a second result;

logically combining the second result of said second logic operation with the existing content of said first register to generate a third result; and overwriting said existing content of said first register with the third result of said logically combining;

wherein said performing said second logic operation and said logically combining are executed in response to a single machine instruction of said data processing unit.

* * * * *